(12) United States Patent
Liu

(10) Patent No.: US 8,750,297 B2
(45) Date of Patent: Jun. 10, 2014

(54) ASCERTAINING PER-HOP NETWORK CHARACTERISTICS

(75) Inventor: Chia J. Liu, Marlton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 330 days.

(21) Appl. No.: 12/796,903

(22) Filed: Jun. 9, 2010

(65) Prior Publication Data

US 2011/0286447 A1 Nov. 24, 2011

Related U.S. Application Data

(60) Provisional application No. 61/346,669, filed on May 20, 2010.

(51) Int. Cl.
*H04L 12/28* (2006.01)
*H04L 12/26* (2006.01)
*H04L 29/12* (2006.01)

(52) U.S. Cl.
CPC .......... *H04L 43/10* (2013.01); *H04L 29/12066* (2013.01); *H04L 43/0882* (2013.01); *H04L 61/1511* (2013.01); *H04L 61/6059* (2013.01)
USPC ..................................... 370/389

(58) Field of Classification Search
USPC ....................................... 370/389
See application file for complete search history.

(56) References Cited

U.S. PATENT DOCUMENTS

| | | | |
|---|---|---|---|
| 6,507,646 B1 * | 1/2003 | Fishler ................ | 379/215.01 |
| 7,065,482 B2 * | 6/2006 | Shorey et al. ........... | 709/224 |
| 7,292,539 B2 * | 11/2007 | Ko et al. .............. | 370/252 |
| 7,330,726 B2 * | 2/2008 | Vare et al. ............ | 455/432.2 |
| 7,801,070 B2 * | 9/2010 | Omae et al. ............ | 370/315 |
| 8,000,280 B2 * | 8/2011 | Takechi et al. .......... | 370/312 |
| 2003/0185208 A1 * | 10/2003 | Lee et al. ............. | 370/389 |
| 2004/0052259 A1 * | 3/2004 | Garcia et al. ........... | 370/392 |
| 2005/0272421 A1 * | 12/2005 | Vare et al. ............ | 455/432.1 |
| 2006/0250988 A1 * | 11/2006 | Garcia et al. ........... | 370/260 |
| 2007/0250560 A1 * | 10/2007 | Wein et al. ............ | 709/201 |
| 2009/0198832 A1 * | 8/2009 | Shah et al. ............ | 709/239 |
| 2010/0057936 A1 * | 3/2010 | Roskind .............. | 709/245 |

FOREIGN PATENT DOCUMENTS

CN 101192951 6/2008

OTHER PUBLICATIONS

Deering et. al., Internet Procol, Version 6 (Plv6) Specification, RFC 2460, Dec. 1998.*
Conta et. al., "Internet Control Message Protocol (ICMPv6) for the Internet Protocol Version 6 (IPv6) Specification," RFC 4443, Mar. 2006.*
Deering et. al., "Request for Comments: 2460," Dec. 1998, Network Working Gruop.*
Vare et. al., "Geographical Positioning Extension for IPv6," 2004, Proceedings of the International Conference on Networking.*

(Continued)

*Primary Examiner* — Mark Rinehart
*Assistant Examiner* — Kenneth P Hunt
(74) *Attorney, Agent, or Firm* — Ballard Spahr LLP

(57) ABSTRACT

A tool that may be used for querying and obtaining per-hop information along a network path, and/or for verifying the host name of each hop against a data repository such as the DNS. The query and response may be transmitted in, e.g., the destination options header of data packets, such as an IPv6 destination options header.

18 Claims, 18 Drawing Sheets

(56) References Cited

OTHER PUBLICATIONS

"Internet Assigned Numbers Authority Option Types," Jul. 2, 2013.*
Deering, et al., "Internet Protocol, Version 6 (IPv6) Specification", RFC2460, IETF Standard, Technical Engineering Task Force, IETF, CH, Dec. 1, 1998, 40 pages.

European Search Report for EP 11 16 6783, mailed Aug. 23, 2011, 10 pages.
Conta, et al., "Internet Control Message Protocol (ICMPv6) for the Internet Protocol Version 6 (IPv6) Specification", RFC 4443, Mar. 2006, pp. 1-25.
Deering, et al., "Internet Protocol, Version 6 (IPv6) Specification", RFC 2460, Dec. 1998, pp. 1-37.

* cited by examiner

```
#traceroute ipv6.google.com as_path=y
traceroute to ipv6.google.com (2001:4860:800f::67), 30 hops max, 40 byte packets
 1  2001:558:1008::1 (2001:558:1008::1) [AS 33662] 0.389 ms  0.399 ms  0.462 ms
 2  po-11-ur01.bearcreek.tx.houston.comcast.net (2001:558:2c0:24::1) [AS 33662] 0.689 ms  0.781 ms  0.867 ms
 3  po-15-ar02.bearcreek.tx.houston.comcast.net (2001:558:2c0:23::2) [AS 33662] 0.481 ms  0.559 ms  0.637 ms
 4  2001:558:0:f6f1::1 (2001:558:0:f6f1::1) [AS 7922] 22.816 ms  22.807 ms  22.800 ms
 5  ix-5-0-0.502.har1.A56-Atlanta.ipv6.as6453.net (2001:5a0:1b00:100::15) [AS 6453] 22.136 ms * *
 6  Vlan50.icore1.A56-Atlanta.ipv6.as6453.net (2001:5a0:1b00:100::a) [AS 6453] 22.422 ms  28.603 ms  34.289 ms
 7  Vlan40.icore1.DTX-Dallas.ipv6.as6453.net (2001:5a0:2e00:500::5) [AS 6453] 76.187 ms  76.168 ms  76.158 ms
 8  if-1-0-0.40.core1.DTX-Dallas.ipv6.as6453.net (2001:5a0:2e00:500::6) [AS 6453] 62.554 ms * *
 9  if-10-0-0.937.mcore5.LAA-LosAngeles.ipv6.as6453.net (2001:5a0:2e00::1e) [AS 6453] 62.637 ms * *
10  POS1-0-0.core4.SQN-SanJose.ipv6.as6453.net (2001:5a0:100:500::40) [AS 6453] 72.035 ms  72.031 ms  72.024 ms
11  if-5-0-0.core3.SQN-SanJose.ipv6.as6453.net (2001:5a0:500:100::9) [AS 6453] 71.964 ms  71.923 ms  72.001 ms
12  eqixsjc-v6.google.com (2001:504:0:1:0:1:5169:1) [AS15169] 72.845 ms  72.689 ms  72.809 ms
13  2001:4860::1:0:7ea (2001:4860::1:0:7ea) [AS15169] 73.727 ms  73.848 ms  73.520 ms
14  2001:4860::1:0:7a4 (2001:4860::1:0:7a4) [AS15169] 92.994 ms  92.888 ms  92.958 ms
15  2001:4860::1:0:3f7 (2001:4860::1:0:3f7) [AS15169] 93.314 ms  92.700 ms  92.584 ms
16  2001:4860::1:0:5dc (2001:4860::1:0:5dc) [AS15169] 99.537 ms  107.399 ms  99.234 ms
17  2001:4860:0:1::14b (2001:4860:0:1::14b) [AS15169] 104.891 ms  103.744 ms  107.517 ms
```

Fig. 19

```
#traceroute ipv6.google.com link_u=y
traceroute to ipv6.google.com (2001:4860:800f::67), 30 hops max, 40 byte packets
 1  2001:558:1008::1 (2001:558:1008::1) [LU 15%] 0.389 ms  0.399 ms  0.462 ms
 2  po-11-ur01.bearcreek.tx.houston.comcast.net (2001:558:2c0:24::1) [LU 17%] 0.689 ms  0.781 ms  0.867 ms
 3  po-15-ar02.bearcreek.tx.houston.comcast.net (2001:558:2c0:23::2 [LU 25%] 0.481 ms  0.559 ms  0.637 ms
 4  2001:558:0:f6f1::1 (2001:558:0:f6f1::1) [LU 30%] 22.816 ms  22.807 ms  22.800 ms
 5  ix-5-0-0.502.har1.A56-Atlanta.ipv6.as6453.net (2001:5a0:1b00:100::15) [LU 45%] 22.136 ms * *
 6  Vlan50.icore1.A56-Atlanta.ipv6.as6453.net (2001:5a0:1b00:100::a) [LU 55%] 22.422 ms  28.603 ms  34.289 ms
 7  Vlan40.icore1.DTX-Dallas.ipv6.as6453.net (2001:5a0:2e00:500::5) [LU 80%] 76.187 ms  76.168 ms  76.158 ms
 8  if-1-0-0.40.core1.DTX-Dallas.ipv6.as6453.net (2001:5a0:2e00:500::6) [LU 90%] 62.554 ms * *
 9  if-10-0-0.937.mcore5.LAA-LosAngeles.ipv6.as6453.net (2001:5a0:2e00::1e) [LU 97%] 62.637 ms * *
10  POS1-0-0.core4.SQN-SanJose.ipv6.as6453.net (2001:5a0:100:500::40) [LU 85%] 72.035 ms  72.031 ms  72.024 ms
11  if-5-0-0.core3.SQN-SanJose.ipv6.as6453.net (2001:5a0:500:100::9) [LU 70%] 71.964 ms  71.923 ms  72.001 ms
12  eqixsjc-v6.google.com (2001:504:0:1:0:1:5169:1) [LU 60%] 72.845 ms  72.689 ms  72.809 ms
13  2001:4860::1:0:7ea (2001:4860::1:0:7ea) [LU 55%] 73.727 ms  73.848 ms  73.520 ms
14  2001:4860::1:0:7a4 (2001:4860::1:0:7a4) [LU 73%] 92.994 ms  92.888 ms  92.958 ms
15  2001:4860::1:0:3f7 (2001:4860::1:0:3f7) [LU 80%] 93.314 ms  92.700 ms  92.584 ms
16  2001:4860::1:0:5dc (2001:4860::1:0:5dc) [LU 90%] 99.537 ms  107.399 ms  99.234 ms
17  2001:4860:0:1::14b (2001:4860:0:1::14b) [LU 75%] 104.891 ms  103.744 ms  107.517 ms
```

Fig. 20

```
#traceroute ipv6.google.com as_path=y link_u=y
traceroute to ipv6.google.com (2001:4860:800f::67), 30 hops max, 40 byte packets
 1  2001:558:1008::1 (2001:558:1008::1) [AS 33662 LU 15%] 0.389 ms  0.399 ms  0.462 ms
 2  po-11-ur01.bearcreek.tx.houston.comcast.net (2001:558:2c0:24::1) [AS 33662 LU 17%] 0.689 ms  0.781 ms
0.867 ms
 3  po-15-ar02.bearcreek.tx.houston.comcast.net (2001:558:2c0:23::2 [AS 33662 LU 25%] 0.481 ms  0.559 ms
0.637 ms
 4  2001:558:0:f6f1::1 (2001:558:0:f6f1::1) [AS 7922 LU 30%] 22.816 ms  22.807 ms  22.800 ms
 5  ix-5-0-0.502.har1.A56-Atlanta.ipv6.as6453.net (2001:5a0:1b00:100::15) [AS 6453 LU 45%] 22.136 ms * *
 6  Vlan50.icore1.A56-Atlanta.ipv6.as6453.net (2001:5a0:1b00:100::a) [AS 6453 LU 55%] 22.422 ms  28.603 ms
34.289 ms
 7  Vlan40.icore1.DTX-Dallas.ipv6.as6453.net (2001:5a0:2e00:500::5) [AS 6453 LU 80%] 76.187 ms  76.168 ms
76.158 ms
 8  if-1-0-0.40.core1.DTX-Dallas.ipv6.as6453.net (2001:5a0:2e00:500::6) [AS 6453 LU 90%] 62.554 ms * *
 9  if-10-0-0.937.mcore5.LAA-LosAngeles.ipv6.as6453.net (2001:5a0:2e00::1e) [AS 6453 LU 97%] 62.637 ms * *
10  POS1-0-0.core4.SQN-SanJose.ipv6.as6453.net (2001:5a0:100:500::40) [AS 6453 LU 85%] 72.035 ms  72.031
ms  72.024 ms
11  if-5-0-0.core3.SQN-SanJose.ipv6.as6453.net (2001:5a0:500:100::9) [AS 6453 LU 70%] 71.964 ms  71.923 ms
72.001 ms
12  eqixsjc-v6.google.com (2001:504:0:1:0:1:5169:1) [AS 15169 LU 60%] 72.845 ms  72.689 ms  72.809 ms
13  2001:4860::1:0:7ea (2001:4860::1:0:7ea) [AS 15169 LU 55%] 73.727 ms  73.848 ms  73.520 ms
14  2001:4860::1:0:7a4 (2001:4860::1:0:7a4) [AS 15169 LU 73%] 92.994 ms  92.888 ms  92.958 ms
15  2001:4860::1:0:3f7 (2001:4860::1:0:3f7) [AS 15169 LU 80%] 93.314 ms  92.700 ms  92.584 ms
16  2001:4860::1:0:5dc (2001:4860::1:0:5dc) [AS 15169 LU 90%] 99.537 ms  107.399 ms  99.234 ms
17  2001:4860:0:1::14b (2001:4860:0:1::14b) [AS 15169 LU 75%] 104.891 ms  103.744 ms  107.517 ms
```

Fig. 21

```
comcast@v6PM1 ~]$ traceroute ipv6.google.com Int_ID=y Host=y AS_path=y link_u=y traceroute to ipv6.google.com (2001:4860:800f::67), 30 hops max, 40 byte packets
 1  GigabitEthernet1/30 ur02.bearcreek.tx.houston (2001:558:1008::1) [AS 33662 LU 15%] 0.389 ms  0.399 ms  0.462 ms
 2  Port-channel11 ur01.bearcreek.tx.houston.comcast.net* (2001:558:2c0:24::1) [AS 33662 LU 17%] 0.689 ms  0.781 ms  0.867 ms
 3  Port-channel15 ar02.bearcreek.tx.houston.comcast.net (2001:558:2c0:23::2) [AS 33662 LU 25%] 0.481 ms  0.559 ms  0.637 ms
 4  TenG0/4/0/5.cr01.miami.fl.ibone.comcast.net (2001:558:0:f6f1::1) [AS 7922 LU 30%] 22.816 ms  22.807 ms  22.800 ms
 5  ix-5-0-0.502.har1.A56-Atlanta.ipv6.as6453.net** (2001:5a0:1b00:100::15) [AS 6453 LU 45%] 22.136 ms * *
 6  Vlan50.icore1.A56-Atlanta.ipv6.as6453.net** (2001:5a0:1b00:100::a) [AS 6453 LU 55%] 22.422 ms  28.603 ms  34.289 ms
 7  Vlan40.icore1.DTX-Dallas.ipv6.as6453.net** (2001:5a0:2e00:500::5) [AS 6453 LU 80%] 76.187 ms  76.168 ms  76.158 ms
 8  if-1-0-0.40.core1.DTX-Dallas.ipv6.as6453.net** (2001:5a0:2e00:500::6) [AS 6453 LU 90%] 62.554 ms  65.125 ms  63.521 ms
 9  if-10-0-0.937.mcore5.LAA-LosAngeles.ipv6.as6453.net (2001:5a0:2e00::1e) [AS 6453 LU 97%] 62.637 ms  67.325 ms  64.545 ms
10  POS1-0-0.core4.SQN-SanJose.ipv6.as6453.net** (2001:5a0:100:500::40) [AS 6453 LU85%] 72.035 ms  72.031 ms  72.024 ms
11  if-5-0-0.core3.SQN-SanJose.ipv6.as6453.net** (2001:5a0:500:100::9) [AS 6453 LU 70%] 71.964 ms  71.923 ms  72.001 ms
12  eqixsjc-v6.google.com** (2001:504:0:1:0:1:5169:1) [AS15169 LU 60%] 72.845 ms  72.689 ms  72.809 ms
13  2001:4860::1:0:7ea (2001:4860::1:0:7ea) [AS15169 LU 55%] 73.727 ms  73.848 ms  73.520 ms
14  2001:4860::1:0:3f7 (2001:4860::1:0:3f7) [AS15169 LU 73%] 92.994 ms  92.888 ms  92.958 ms
15  2001:4860::1:0:7a4 (2001:4860::1:0:7a4) [AS15169 LU 80%] 93.314 ms  92.700 ms  92.584 ms
16  2001:4860::1:0:5dc (2001:4860::1:0:5dc) [AS15169 LU 90%] 99.537 ms  107.399 ms  99.234 ms
17  2001:4860:0:1::14b (2001:4860:0:1::14b) [AS15169 LU 75%] 104.891 ms  103.744 ms  107.517 ms
```

Fig. 22

ASCERTAINING PER-HOP NETWORK CHARACTERISTICS

CROSS-REFERENCE TO RELATED APPLICATIONS

The present application claims priority to U.S. Provisional Patent Application Ser. No. 61/346,669, filed May 20, 2010, entitled "Ascertaining Per-Hop Network Characteristics," hereby incorporated by reference herein as to its entirety.

BACKGROUND

Network debugging tools such as Traceroute and Ping may be used to obtain information about network nodes and paths. However, these tools do not provide much information about the experience of a packet at each of multiple hops through a path. For example, no conventional tools adequately identify the autonomous systems, congestion, and other information on a per-hop basis through a path.

The problems with the current Traceroute and Ping tools are even more pronounced as Internet Protocol version 6 (IPv6) becomes more widely used, and which is expected to become the standard IP protocol throughout the Internet and other networks. For example, in the context of the Internet, these tools either provide or rely on host names stored in the Domain Name System (DNS). However, it is known that DNS entries, and especially IPv6 entries, may be missing or erroneous. When the returned DNS name of an intermediate hop is erroneous, the Traceroute result can be very confusing to the user. The user may misinterpret the result as a routing issue or other issue that in fact may or may not exist.

SUMMARY

It may be desirable to provide a tool that allows a user to obtain per-hop information along a path. Such information may include, for example, the host name (which may include the domain name) of each hop, or node in which a routing decision is made, in the path; the autonomous system number (ASN) in which each hop resides; the link utilization experienced at each hop; and/or the interface ID used at each hop. This information may be provided directly from each hop via a predetermined protocol. For example, queries for this information, and their responses, may be provided in the destination options header of a data packet, such as an IPv6 data packet.

Accordingly, some aspects described herein are directed to various example systems, methods, and computer-executable instructions stored on an intransient computer-readable medium are described, which may involve or be configured for sending a first plurality of data packets each comprising a destination options header and each being sent with a different time-to-live indication; receiving a second plurality of data packets each identifying a different one of the first plurality of data packets and each identifying a different network address; and sending a third plurality of data packets each comprising a destination options header indicating a same first destination option type, each of the third plurality of data packets being addressed to a different one of the network addresses identified by the second plurality of data packets.

According to further aspects, various example systems, methods, and computer-executable instructions stored on an intransient computer-readable medium are described, which may involve or be configured for receiving at a network node a first data packet comprising a destination options header indicating a first destination option type; determining first information based on a value of the first destination option type; and sending a second data packet comprising a destination options header indicating the first destination option type and including the determined first information in a first destination option content portion of the destination options header.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein:

FIG. 11 is an example representation of data in a portion of a destination options header in an IPv6 message sent by a device in accordance with one or more aspects of the present disclosure;

FIG. 12 is an example representation of data in a portion of a destination options header in an IPv6 reply message in accordance with one or more aspects of the present disclosure;

FIG. 13 is an example representation of data in a portion of a destination options header in an IPv6 message sent by a device in accordance with one or more aspects of the present disclosure;

FIG. 14 is an example representation of data in a portion of a destination options header in an IPv6 reply message in accordance with one or more aspects of the present disclosure;

FIG. 15 is an example representation of data in a portion of a destination options header in an IPv6 message sent by a device in accordance with one or more aspects of the present disclosure;

FIG. 16 is an example representation of data in a portion of a destination options header in an IPv6 reply message in accordance with one or more aspects of the present disclosure;

FIG. 17 is an example representation of data in a portion of a destination options header in an IPv6 message sent by a device in accordance with one or more aspects of the present disclosure;

FIG. 18 is an example representation of data in a portion of a destination options header in an IPv6 reply message in accordance with one or more aspects of the present disclosure;

FIG. 19 is an example display that may be generated in accordance with one or more aspects of the present disclosure;

FIG. 20 is an example display that may be generated in accordance with one or more aspects of the present disclosure;

FIG. 21 is an example display that may be generated in accordance with one or more aspects of the present disclosure; and FIG. 22 is an example display that may be generated in accordance with one or more aspects of the present disclosure.

DETAILED DESCRIPTION

Figure 1:
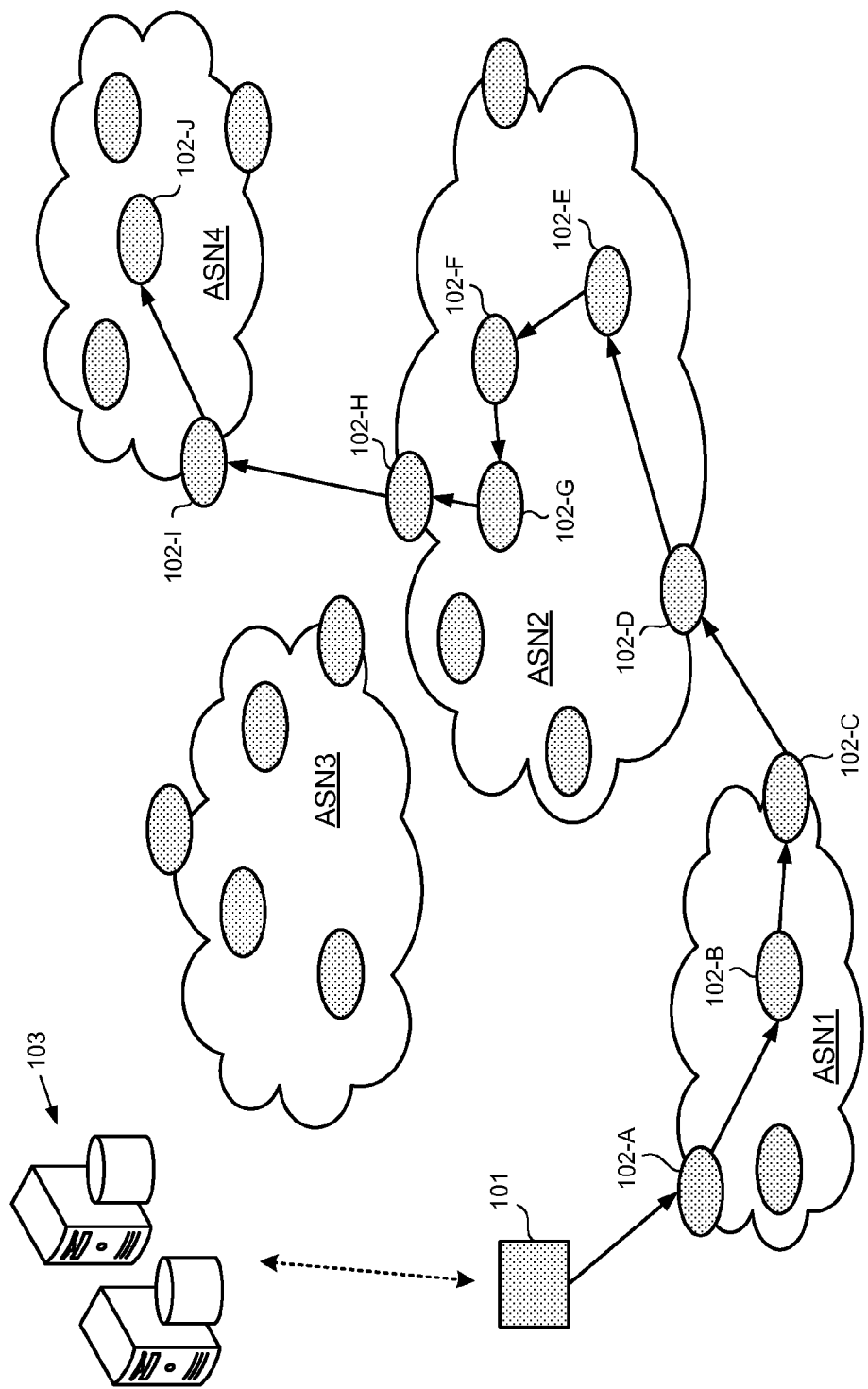
FIG. 1 is a functional block diagram of an example network that may be probed by a tool as described herein.

FIG. 1 is a functional block diagram of an example network that includes a plurality of nodes including at least nodes 102A-J. The network may also either include or be communicatively coupled to a source device 101 and/or a domain name server (DNS) system 103. FIG. 1 also shows an example logical communication path through the network as an ordered series of arrows. One of the arrows couples a communication interface of source device 101 with a communication interface of node 102-A, and the remaining arrows each couple different pairs of nodes 102 (e.g., routers) together at their communication interfaces. The path represented by the set of arrows is a path that would be taken by a data packet sent from source device 101 to node 102-J. The path may be a static path that does not change its route over time, or a dynamic path that does change its route over time. In other embodiments, the path may be or be part of a multicast tree, in which the path may split into multiple branches from one or more of nodes 102. Each of the various connections between nodes 102 in the network, may be physically embodied as one or more wired and/or wireless connections, such as via coaxial cable, electrical wire, optical fiber, radio frequency transmissions, cellular transmissions, hybrid connections comprising combinations of transmission media, and the like.

As further shown in FIG. 1, at least some of the nodes 102 are organized as a plurality of autonomous systems. In this example, four autonomous systems designated by the following autonomous system numbers (ASNs) are shown: ASN1, ASN2, ASN3, ASN4. Autonomous systems and their ASNs are well-known, and may each include a set of connected routing prefixes that are under the control of a particular entity or set of entities, such as Internet service providers (ISPs). Each autonomous system may have its own routing policy within the autonomous system and with systems external to that autonomous system. Each autonomous system may include one or more border nodes 102 that act as interfaces for communications into and out of the autonomous system. Examples of such border nodes in FIG. 1 include nodes 102-C, 102-D, 102-H, and 102-I. A border node may implement a routing protocol commonly referred to as Border Gateway Protocol (BGP), to allow for systems outside the associated autonomous system to communicate with nodes within the autonomous system, and vice-versa.

Any of the elements 101, 102, and/or 103 of FIG. 1 may be implemented as or otherwise include a computer. A computer may include any electronic, electro-optical, and/or mechanical device, or system of multiple physically separate such devices, that is able to process and manipulate information, such as in the form of data. Non-limiting examples of a computer include one or more personal computers (e.g., desktop, palmtop, or laptop), servers, smart phones, personal digital assistants (PDAs), television set top boxes, service gateway devices, digital video recorders, mobile video devices, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions, such as a network router. In the examples that will be discussed herein, it will be assumed, by way of example, that source device 101 is a personal computer or server, and nodes 102 each are either a router or include a router. However, this is merely an example; source device 101 may alternatively be a router or any other type of network element, and each of nodes 102 may also be various types of network elements.

Figure 2:
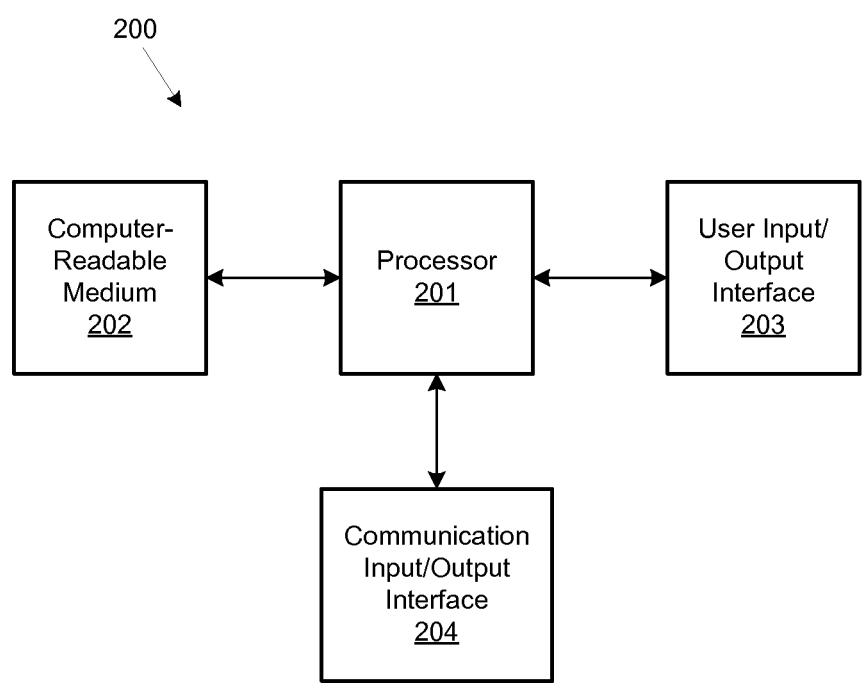
FIG. 2 is a functional block diagram of an example computer that may embody one or more elements or functions of FIG. 1.

An example functional-block representation of a computer 200 is shown in FIG. 2, from which any of blocks 101, 102, and/or 103 may be implemented. Computer 200 may include hardware that may execute software to perform specific functions. The software, if any, may be stored on a computer-readable medium 202 in the form of computer-readable instructions. Computer 200 may read those computer-readable instructions, and in response perform various steps as defined by those computer-readable instructions. Thus, any functions attributed to source device 101, nodes 102, and DNS system 103 as described herein may be implemented, for example, by reading and executing such computer-readable instructions for performing those functions, and/or by any hardware subsystem (e.g., a processor 201) from which computer 200 is composed. Additionally or alternatively, any of the above-mentioned functions may be implemented by the hardware of computer 200, with or without the execution of software. For example, computer 200 may be or include an application-specific integrated circuit (ASIC), field-programmable gate array (FPGA), or other type of circuitry that is configured to perform some or all of the functions attributed to computer 200. In such embodiments, processor 201 may be implemented as or otherwise include the ASIC, FPGA, or other type of circuitry.

Computer-readable medium 202 may include not only a single physical intransient medium or single type of such medium, but also a combination of one or more such media and/or types of such media. Examples of computer-readable medium 202 include, but are not limited to, one or more memories, hard drives, optical discs (such as CDs or DVDs), magnetic discs, and magnetic tape drives.

Computer-readable medium 202 may be physically part of, or otherwise accessible by, computer 200, and may store computer-readable instructions (e.g., software) and/or computer-readable data (i.e., information that may or may not be executable). In the present example, computer-readable medium 202 (such as memory and/or a hard drive) may be included in any one or more of blocks 101, 102, and 103, and may store computer-executable instructions and/or data used by any of those blocks 101, 102, and 103. Alternatively or additionally, computer-readable medium 202 storing the data and/or software may be physically separate from, yet accessible by, blocks 101, 102, and 103.

Computer 200 may also include a user input/output interface 203 for receiving input from a user (e.g., via a keyboard, mouse, and/or remote control) and providing output to the user (e.g., via display device 107 or 108, an audio speaker, and/or a printer). Computer 200 may further include a communication input/output interface 204 for communicating with devices external to computer 200, such as with other nodes in the network (which may include source device 101). Thus, any communication between blocks 101, 102, and 103 may be attributed to communication via communication input/output interface 104 of those respective blocks.

Figure 3:
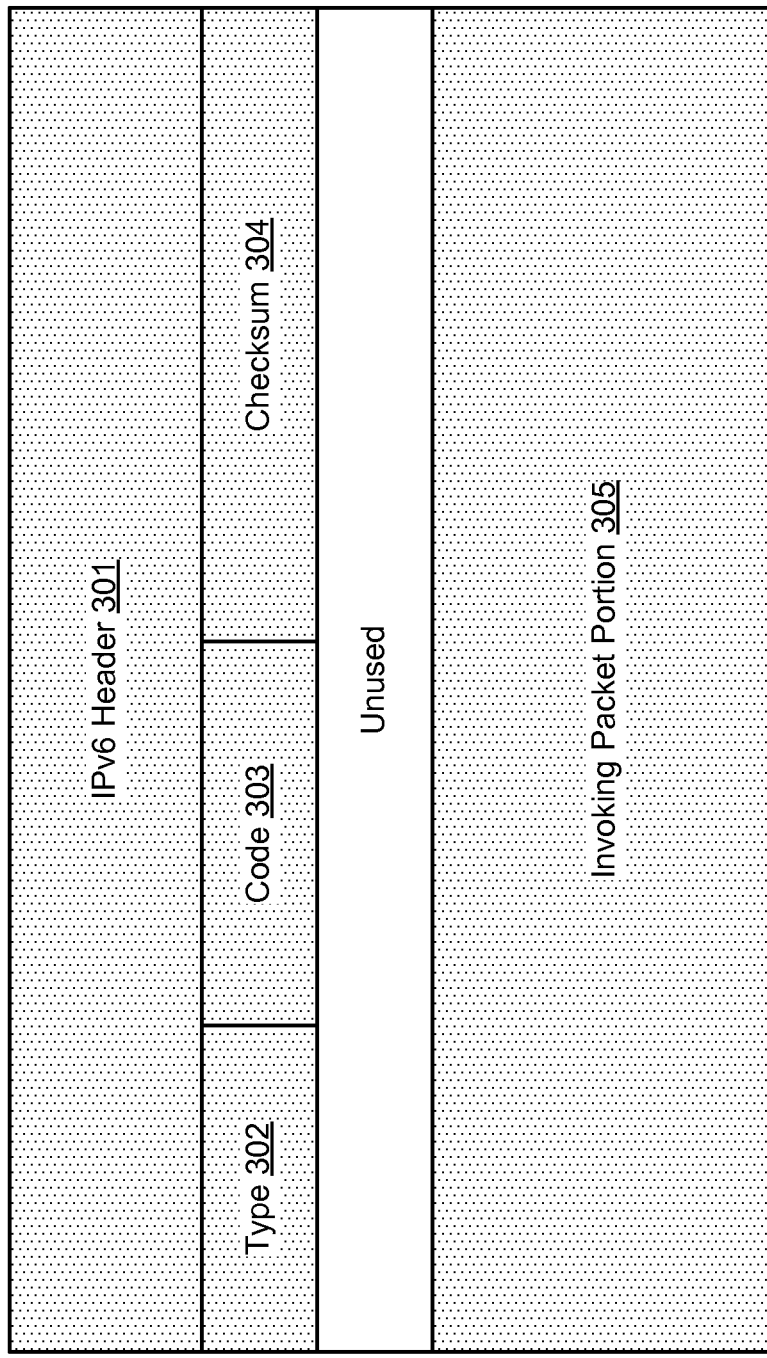
FIG. 3 is an example representation of the data organization of a standard ICMPv6 message.

FIG. 3 is an example representation of the data organization of an Internet Control Message Protocol v6 (ICMPv6) message, which may be in accordance with one or more standards, such as RFC 4443. As is well-known, when a network node receives a packet (referred to as an invoking packet) for which a processing error occurs at the receiving network node, the network node will typically send an ICMPv6 message back to the source node that sent the invoking packet. There are various types of ICMPv6 messages. One type of ICMPv6 message is a time-exceeded message, which is typically sent in response to a network node receiving an invoking packet having a time-to-live (TTL) of zero after the TTL is decremented at the receiving node. Another type of ICMPv6 message is a destination unreachable message, which is typically sent in response to the invoking packet not being able to reach its intended destination for reasons other than network congestion. One sub-type of destination unreachable message is a port unreachable message.

In one example, the conventional Traceroute command typically causes a series of packets to be sent through a path, each packet having a different TTL. For those packets having a TTL that does not reach the end of the path (due to the TTL being decremented to zero prior to the end of the path), an ICMPv6 time-exceeded message may be generated and returned to the sending node implementing the Traceroute command. The time-exceeded message may identify the invoking Traceroute packet that caused the time-exceeded message to be generated. For a packet that does have a sufficiently high TTL to reach the end of the path, the final recipient node at which TTL equals zero will typically send an ICMPv6 port unreachable message to the sending node (e.g., source device 101), identifying the invoking Traceroute packet that caused the port unreachable message to be generated.

As shown in FIG. 3, an ICMPv6 message may include, for example an IPv6 header 301, a type indicator 302, a code 303, a checksum 304, and at least a portion 305 of the invoking packet that caused the ICMPv6 message to be generated (as much of the invoking packet that can fit). Because the region of ICMPv6 message labeled as 305 may include the header of the invoking packet, region 305 may serve to identify the invoking packet so that the ICMPv6 message may be correlated at source device 101 with the invoking packet.

Figure 4:
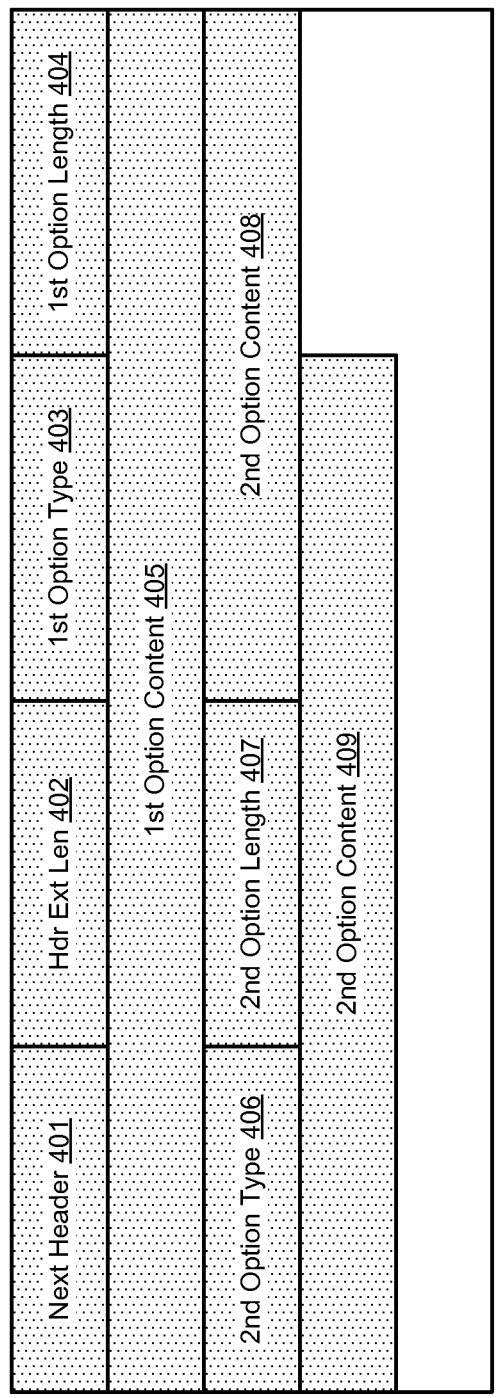
FIG. 4 is an example representation of the data organization of a destination options header that may be included in an IPv6 header of a data packet.

IPv6 header 301 may include a variety of different information, and the format of an IPv6 header is well-known. One type of information that may be included as part of an IPv6 header is a destination options header, which is also well-known per RFC 2460. An example organization of a destination options header is shown in FIG. 4. In this example, a destination options header of an IPv6 data packet includes a next header indicator 401, a header extension length (Hdr Ext Len) indicator 402, and one or more option types (403, 406). In addition, there will be one option length (404, 407) and one option content (405, 408) for each identified option type. In this example, there are two options types, two option lengths, and two option contents. However, other destination options headers may include only a single option type, a single option length, and a single option content, or more than two of each. Moreover, it is possible that other destination options header formats may be used, such as in other protocols (e.g., future versions of the IP protocol).

A destination options header is typically intended to be processed only at the destination node in a network, as opposed to intermediate network nodes in the path leading to the destination node. For each IPv6 invoking packet received at a node, that node may determine from the packet in a conventional manner whether the node is the intended destination node. If the node is not the destination node, and if the TTL of the packet is not yet zero, then the packet (with a decremented TTL) may be passed to the next node in the path toward the destination. If the node is the destination node, then the node may process the destination options header, among other activities.

As will be discussed below, one way that the destination options header may be processed by the destination node is to interpret the destination options header as a query for information, and to respond to that query with information sent to the source of the invoking packet. The particular information being queried may be identified as particular value of the option type 403 (or 406) in a packet sent to the destination node 102. And, the destination node 102 may be configured to interpret the value of the option type of the packet and return the requested information, based on the option type, to the source of the packet. Depending upon the value of the option type of a destination options header, the type of information being queried may include, for example, an ASN of the destination node, a link utilization of a communication interface of the destination node, a interface ID of the destination node, and/or a host name of the destination node. As will be further seen, a single destination options header may query multiple pieces of information simultaneously. This may be done either by including multiple different option type values in the same destination options header, and/or by associating multiple queries with a single option type value.

Figure 5:
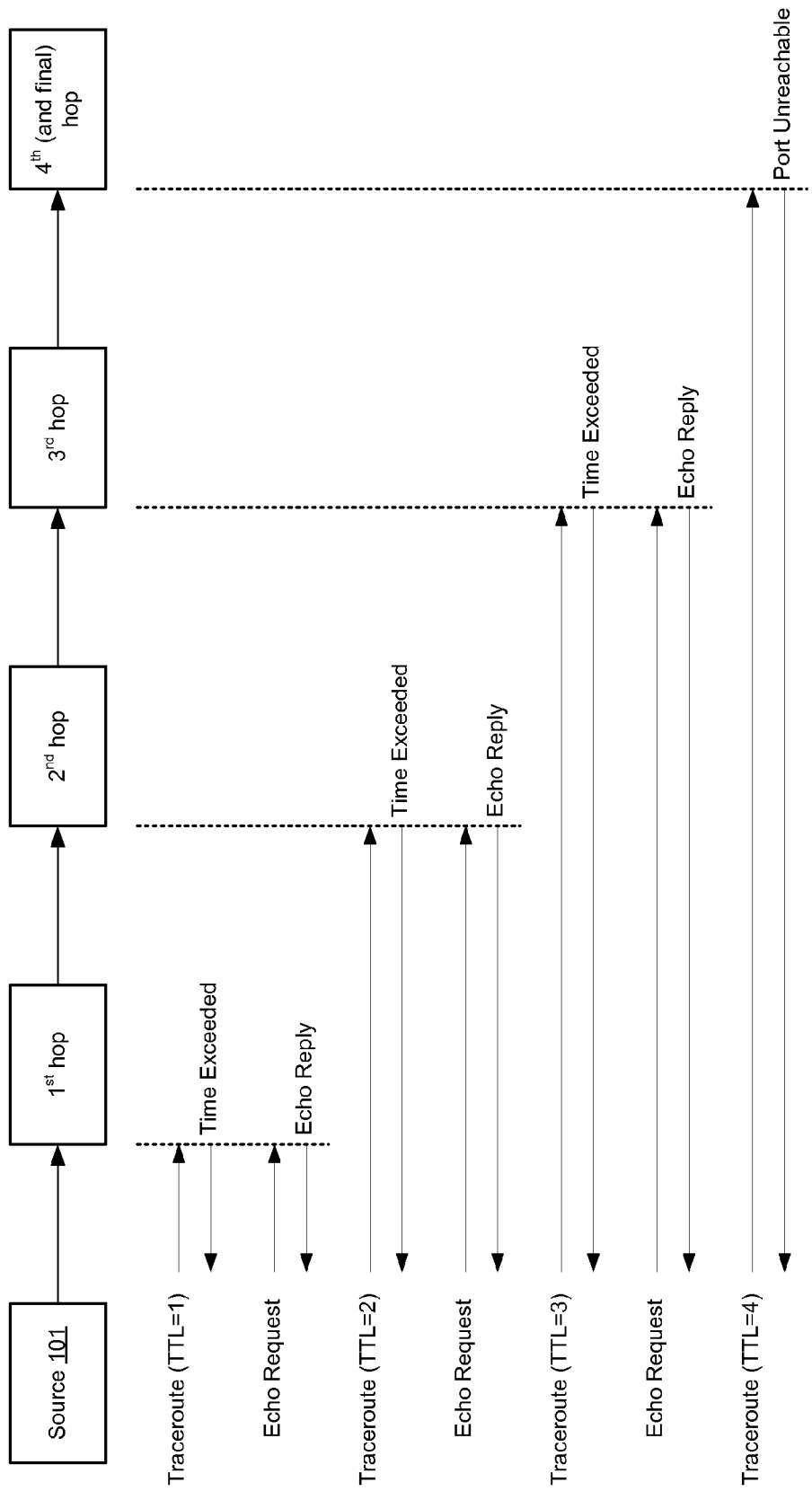
FIG. 5 is a chart showing an example flow of messages between a source device and various nodes in a network in accordance with one or more aspects of the present disclosure.

FIG. 5 is a chart showing an example flow of messages between a source device and various nodes in the network, that may be used to implement a query-response process such as described above. In the present example, it will be assumed for example and the sake of discussion that the source device is source device 101, and that the network nodes are nodes 102.

As shown in FIG. 5, source device 101 may initially send an invoking packet, such as a Traceroute packet, with the TTL of the packet being equal to 1. Assuming that the path taken by the invoking packet is longer than one hop deep, the first node in the path may respond to the invoking packet by returning an ICMP time-exceeded message to source device 101. The time-exceeded message may identify, among other information, the IP address of the node that generated the time-exceeded message. Because source device 101 may now know the IP address of that first hop node, source device 101 can send a query packet, such as an echo request packet commonly used in the ping utility, to the first hop node, identifying the first hop node as the destination node. This query packet may also include a destination options header that may be interpreted as a query for information from the destination node. Upon receiving the query packet identifying the first hop node as the destination node, the first hop node may read and interpret the destination options header, and may respond to the query therein by sending a response message, such as an echo reply packet, to source device 101. The response message may include the information requested in the query, such as in the destination options header of the echo reply packet.

This pattern of (1) sending an invoking packet, (2) receiving a time-exceeded message, (3) sending a query packet, and (4) receiving a response message, may be repeated at each deeper level into the network path, until the end of the path is reached. In the particular example of FIG. 5, the path is four hops deep from the point of view of source device 101.

When the deepest hop is reached by the invoking packet (in this example, where TTL of the invoking packet is initially set to a value of four), the deepest hop node may respond in a conventional manner with an ICMP port unreachable message, rather than an ICMP time exceeded message. The port unreachable message may indicate to source device 101 that the deepest node in the path has been reached, and so source device 101 may stop sending further invoking packets with higher TTL values.

The deepest node may also determine itself to be the destination node by virtue of being the deepest node, and thus may read and interpret any destination options header that may be included in the invoking packet (e.g., the Traceroute packet). It therefore may be desirable to include a query in a destination options header of the invoking packet to the deepest node. However, because it will not normally be known which node is the deepest node until it is reached, it may be desirable to include the query in a destination options header in each of the invoking packets, in addition to each of the query packets. For example, if the query is for the ASN of each of the nodes 102 along the path, then in the example of FIG. 5, all four Traceroute packets and all three echo request packets may each include a destination options header that includes a query for the ASN of the responding packet.

Alternatively, rather than include the destination options header query in each invoking packet, the destination options header query may be included only in the query packets (e.g., the echo request packets). In such a case, source device 101 may further send an echo request packet to the deepest node in the path once the IP address of that deepest node is identified by the ICMP port unreachable message as received by source device 101.

Figure 6:
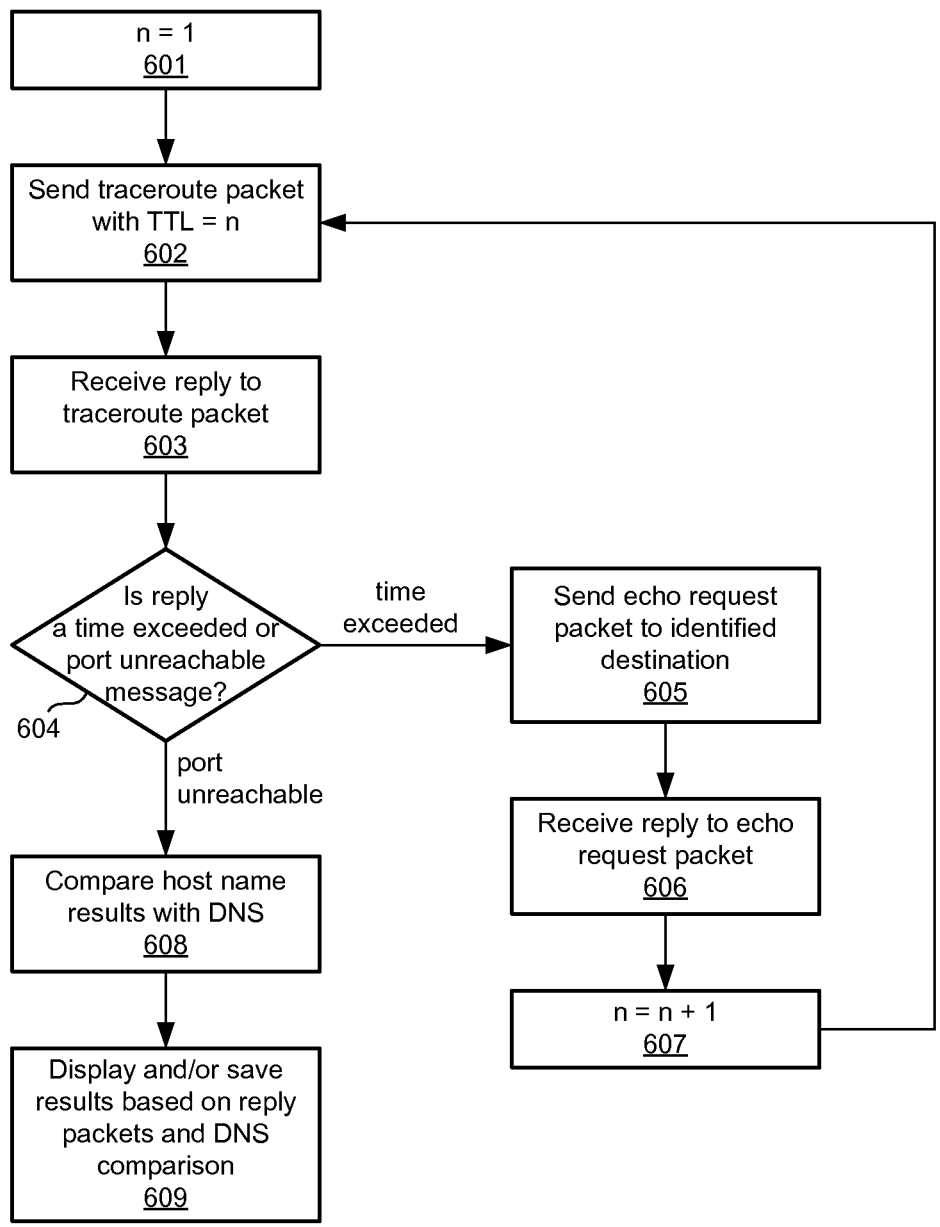
FIG. 6 is a flowchart showing an example method that may be performed by a device in accordance with one or more aspects of the present disclosure.

The above-discussed process is also set forth in the example flowchart of FIG. 6. Referring to the example network of FIG. 1, each of the functions set forth in the blocks of FIG. 6 may be performed by source device 101, and may be implemented by executing software to perform these functions.

At block 601, a counter n (which may be stored in a computer-readable medium of source device 101) is set to a predetermined value, such as n=1. Then, at block 602, an invoking packet (such as a Traceroute packet) having a TTL=n is sent into the network. In response, a reply to the Traceroute packet is received at block 603, and at block 604 source device 101 determines whether the reply is a time-exceeded message or a port unreachable message. If the reply is a time exceeded message, then at block 605 the IP address of the node sending the time exceeded message is extracted from the time exceeded message, and a query packet (e.g., an echo request packet) is sent to the identified IP address as the destination IP address. Next, at block 606, a reply to the echo request packet is received. At block 607, counter n is incremented (such as n=n+1), and then the process returns to block 602.

If the reply as determined at block 604 is a port unreachable message, then source device 101 knows that the node sending the port unreachable message is the deepest node in the path, and so the process may move to block 608 and/or block 609. Where the query is for a host name of the node, then the host name identified in the destination options header of the port unreachable message may be compared with a known database of host names, such as the DNS 103 of the Internet or another database or other information repository accessible by source device 101. The comparison may involve determining whether the host name identified by the port unreachable message is the same as the pre-stored host name in the database or other information repository that is associated with the IP address of the node identified in the port unreadable message.

At block 609, the responses to the queries may be stored in a computer-readable medium and/or displayed on a display screen in human-readable form. Examples of such displayed information will be discussed further below with reference to FIGS. 19-22. Also, the information displayed at block 609 may depend upon the outcome of the comparison in block 608. For example, if the host name of the returned message is different from the host name of the DNS 103 (or other information repository), then the display may indicate that a difference exists, such as via a symbol or textual explanation. In addition, the display may display only the host name identified by the returned message, the host name as stored in the DNS 103 (or other information repository), or both. As another example, if the host name identified in the returned message is identical to that stored in the DNS 103 or other information repository, then the above-mentioned indication or textual message may not appear, or another type of indication and/or textual message may appear, indicating the outcome of the comparison. As yet another example, it may be possible that the return message fails to include the requested host name. This may occur, for example, if the network node is not configured to provide such information. If this occurs, then the host name as stored in the DNS 103 or other information repository may be displayed, and yet another indication may be displayed indicating that the displayed host name was obtained from the DNS 103 or other information repository.

Moreover, if the comparison results in a determination that the information stored in the DNS 103 does not match the information received in the returned message, then the DNS 103 or other information repository may be updated or otherwise corrected with the information received in the returned message. It may be desirable to do so, because it is reasonable to assume that the host name information of a network node, that is provided by the network node itself, is reliable information. In this way, missing or incorrect host names may be updated to the DNS 103 or other information repository. The updating may be implemented by, for example, source device 101 sending a message to the DNS 103 or other information repository indicating the correct host name and associated IP address.

Figure 7:
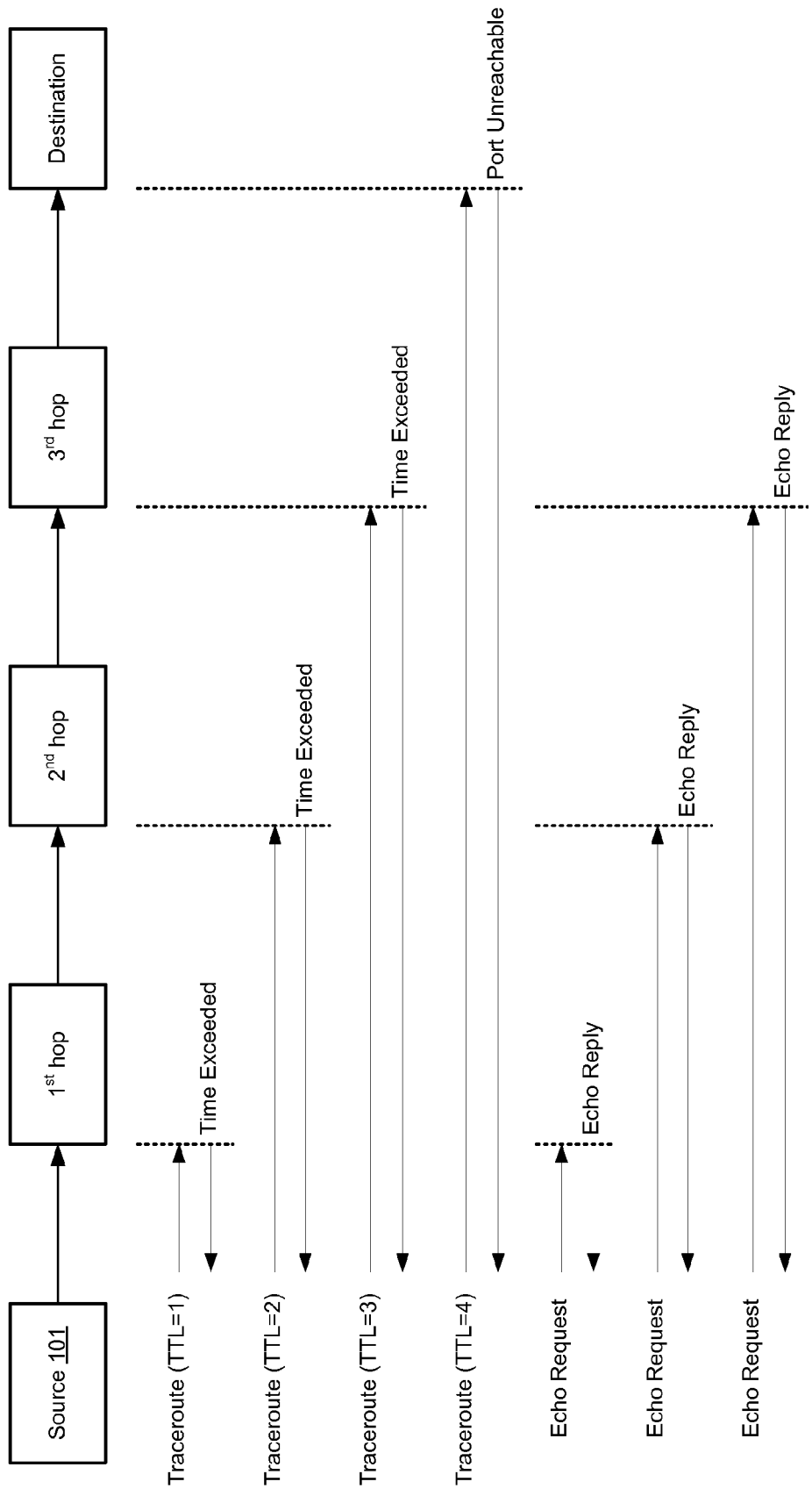
FIG. 7 is a chart showing another example flow of messages between a device and various nodes in a network in accordance with one or more aspects of the present disclosure.
Figure 8:
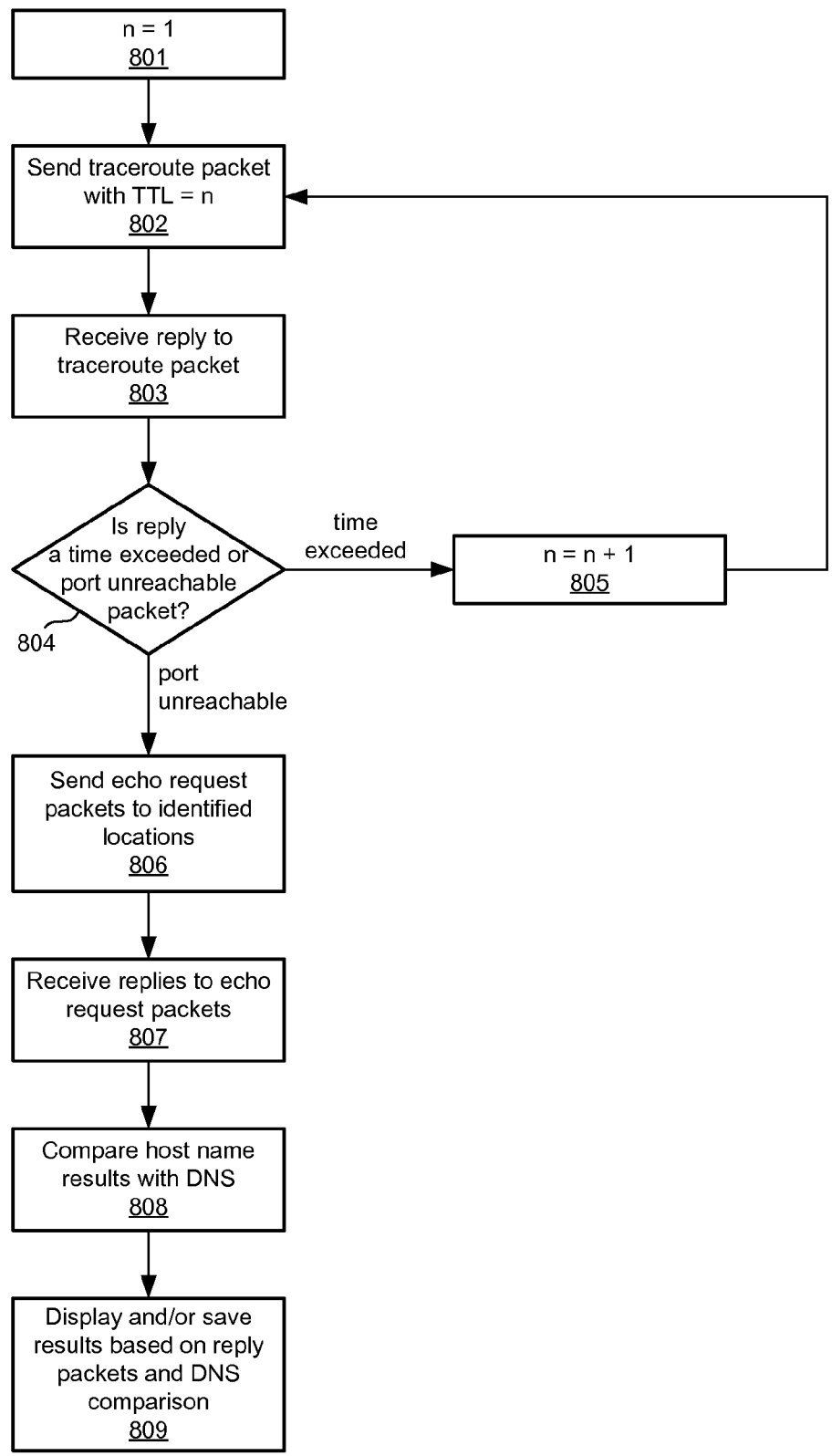
FIG. 8 is a flowchart showing an example method that may be performed in accordance with one or more aspects of the present disclosure.

FIGS. 7 and 8 show another example process for querying nodes that is a variation of the process of FIGS. 5 and 6. In FIG. 7, rather than sending a pair of a Traceroute packet and an echo request packet for each TTL value before moving to the next incremented TTL value, all of the Traceroute packets with the various TTL values may be sent until the deepest node is reached, and then all of the desired echo request packets may be sent to the various TTL values. A difference between FIG. 5 and FIG. 7, therefore, is the order in which the various packets are sent and received. Referring to FIG. 8, blocks 801-804 may be the same as blocks 601-604, and if the reply is determined at block 804 to be a time exceeded message, then counter n is merely incremented and the process is returned to block 802 for sending a further Traceroute packet.

Once the reply message is determined at block 804 to be a port unreachable message, then the process moves to blocks 806-809 to send echo request packets, process their replies, compare host name results, and store and/or display results in a similar manner as discussed previously with regard to FIG. 6.

In still further variations, if the IP address and/or host name of a particular network node 102 is already known, then source 102 may perform a single modified ping operation by sending an echo request packet to the known network node 102, without necessarily also performing the modified Traceroute operation discussed herein. In this case, the echo request packet may include any one or more of the IPv6 destination options queries discussed herein.

Figure 9:
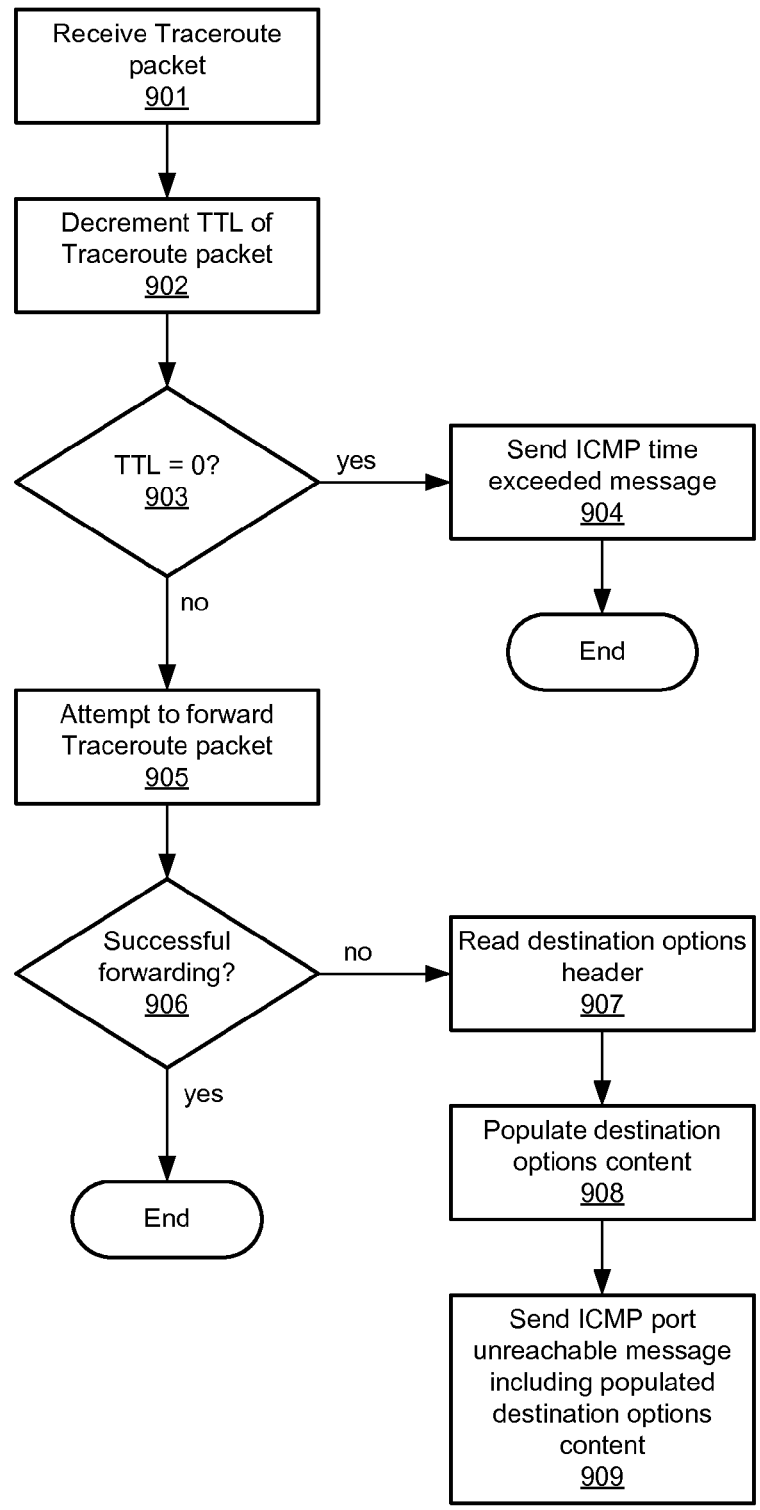
FIG. 9 is a flowchart of an example method that may be performed by a node of a network in accordance with one or more aspects of the present disclosure.

FIG. 9 is a flowchart showing an example method that may be performed by a network node, such as by any of nodes 102. At block 901, a node 102 receives a Traceroute packet, which may have originated from source device 101. The Traceroute packet may be one of the Traceroute packets discussed in connection with FIGS. 5-8. At block 902, node 102 decrements the TTL of the received Traceroute packet, and at block 903 it is determined whether the TTL is equal to zero. Alternatively, node 102 could determine whether the TTL is equal to one, and then decrement the TTL (thus reversing the order of those blocks). In the present example, if the TTL is determined to be equal to zero, then this means that the Traceroute packet has reached its indicated depth, and so in response node 102 sends an ICMP time exceeded message back to the originator of the Traceroute packet (in this case, source device 101).

However, if it is determined that the TTL of the Traceroute packet is not equal to zero, then at block 905 node 102 attempts to forward the Traceroute packet (with the decremented TTL value) to the next node 102 toward the destination indicated by the Traceroute packet. At block 906, if the Traceroute packet is successfully forwarded, then the process ends and node 102 awaits the receipt of a future packet. However, node 102 may determine that the Traceroute packet cannot be forwarded. This may occur, for example, where node 102 is the last node in the path. If such a determination is made at block 906, then at block 907 node 102 may consider itself the destination of the Traceroute packet, and thus may proceed to read and interpret the destination options header, if any, included in the Traceroute packet. As discussed previously, the destination options header of the a received packet may be interpreted as a query or other request for particular information.

Then, at block 908, node 102 may create an ICMP port unreachable message that includes a destination options header containing information responsive to the query represented by the destination options header of the Traceroute packet. For example, if the destination options header of the Traceroute packet is interpreted by node 102 to request the ASN of node 102, then node 102 may populate the content of the destination options header of the ICMP port unreachable message with data representing the ASN in which node 102 sits. Or, if the destination options header of the Traceroute packet is interpreted by node 102 to request the link utilization of an interface of node 102, then node 102 may populate the content of the destination options header of the ICMP port unreachable message with data representing the link utilization of the interface. Or, if the destination options header of the Traceroute packet is interpreted by node 102 to request an interface ID of node 102, then node 102 may populate the content of the destination options header of the ICMP port unreachable message with data representing the requested interface ID. Or, if the destination options header of the Traceroute packet is interpreted by node 102 to request the host name of node 102, then node 102 may populate the content of the destination options header of the ICMP port unreachable message with the host name of node 102. Other types of information may be additionally or alternatively requested and supplied in this manner as well.

Figure 10:
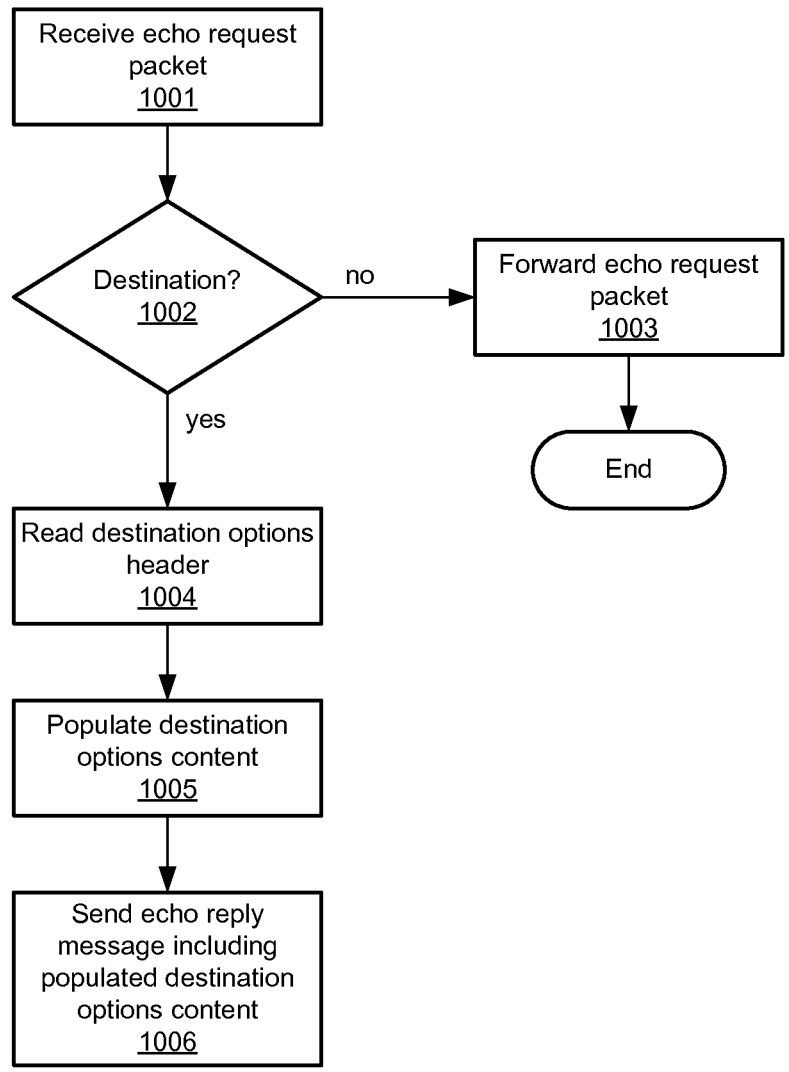
FIG. 10 is a flowchart of an example method that may be performed by a node of a network in accordance with one or more aspects of the present disclosure.

FIG. 10 is a flowchart showing another example method that may be performed by a network node, such as by any of nodes 102. At block 1001, a node 102 receives an echo request packet, which may have originated from source device 101. The echo request packet may be one of the echo request packets discussed in connection with FIGS. 5-8. AT block 1002, node 102 compares the destination indicated in the echo request packet. If that node 102 is the destination, then the process moves to block 1004. If that node 102 is not the destination, then at block 1003, that node 102 forwards the echo request packet to the next node in the path toward the indicated destination. The next node 102 that receives the forwarded echo request packet may then perform the process of FIG. 10, beginning at block 1001.

At block 1004, since node 102 is the destination of the echo request packet, node 102 reads and interprets the destination options header, if any, included in the echo request packet. As discussed previously, the destination options header of the received echo request packet may be interpreted as a query or other request for particular information.

Then, at block 1005, node 102 may create an echo reply message that includes a destination options header containing information responsive to the query represented by the destination options header of the echo request packet. For example, if the destination options header of the echo request packet is interpreted by node 102 to request the ASN of node 102, then node 102 may populate the content of the destination options header of the echo reply message with data representing the ASN in which node 102 sits. Or, if the destination options header of the echo request packet is interpreted by node 102 to request the link utilization of an interface of node 102, then node 102 may populate the content of the destination options header of the echo reply message with data representing the link utilization of the interface. Or, if the destination options header of the echo request packet is interpreted by node 102 to request an interface ID of node 102, then node 102 may populate the content of the destination options header of the echo reply message with data representing the requested interface ID. Or, if the destination options header of the echo request packet is interpreted by node 102 to request the host name of node 102, then node 102 may populate the content of the destination options header of the echo reply message with the host name of node 102. Other types of information may be additionally or alternatively requested and supplied in this manner as well.

Figures 11, 12:
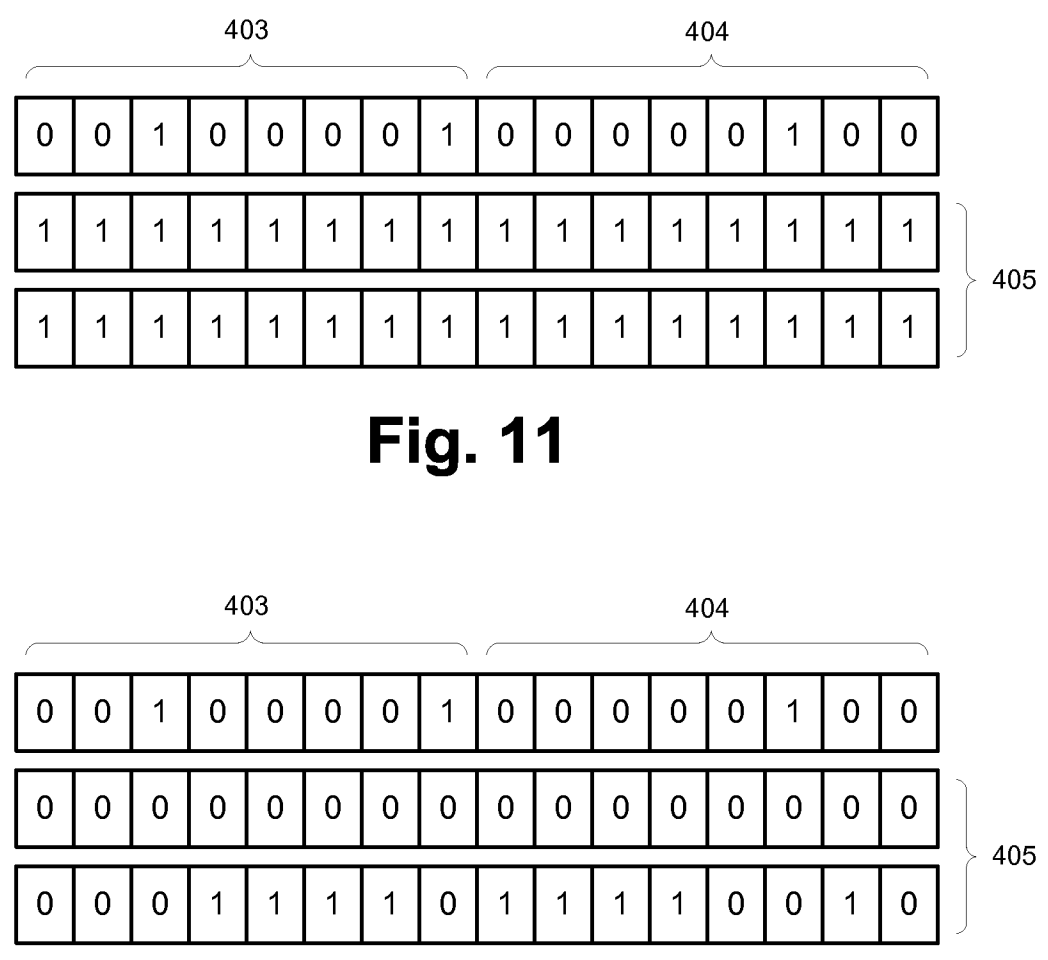

As discussed above, the destination options header may contain data that may be interpreted as a query for particular information. The particular data in the destination options header may determine what information is being sought. For example, FIG. 11 is an example representation of such data in a portion of an IPv6 destination options header in a message sent by a source device (e.g., source device 101), wherein the destination options header indicates a request for an autonomous system number (ASN) of the node that receives and processes the destination options header. The message containing the destination options header may be, e.g., an invoking packet (such as a Traceroute packet) or a query packet (such as an echo request packet).

In the example of FIG. 11, option type 403 has a value of binary 00100001 (decimal 33), the value of which signifies an ASN query as opposed to another type of query. However, any value of option type 403 may be used to signify an ASN query.

Also, in this example, the option length 404 is shown as being binary 00000100 (decimal 4), meaning that the option content 405 is four bytes in length. This length was chosen for this example because it may be expected that all ASN numbers would fit within four bytes. Of course, any other length may be used. And, in this example, the option content 405 is shown as being all binary 1s. In this particular implementation, all 1s would indicate that the ASN query is active and that a response is desired. In contrast, all 0s might indicate that the ASN query, while included in the destination options header, is inactive and no response is desired. Alternatively, if no response is desired to an ASN query, the ASN query could be left out altogether. Moreover, all 1s and all 0s are merely examples; any other predetermined values may be used for signifying whether a particular query is active or inactive.

FIG. 12 shows an example reply destination options header that may be included in a reply message (such as an ICMP time exceeded message, an ICMP port unreachable message, or an echo reply packet), in response to a packet containing the destination options header of FIG. 11. In this example, the option type 403 and length 404 remain the same as in the query, and the processing node 102 populates the option content 405 with the desired response, which in this case would be the ASN of the processing node 102. In this example, the ASN is binary 00000000 00000000 00011110 11110010 (decimal 7922).

Figures 13, 14:
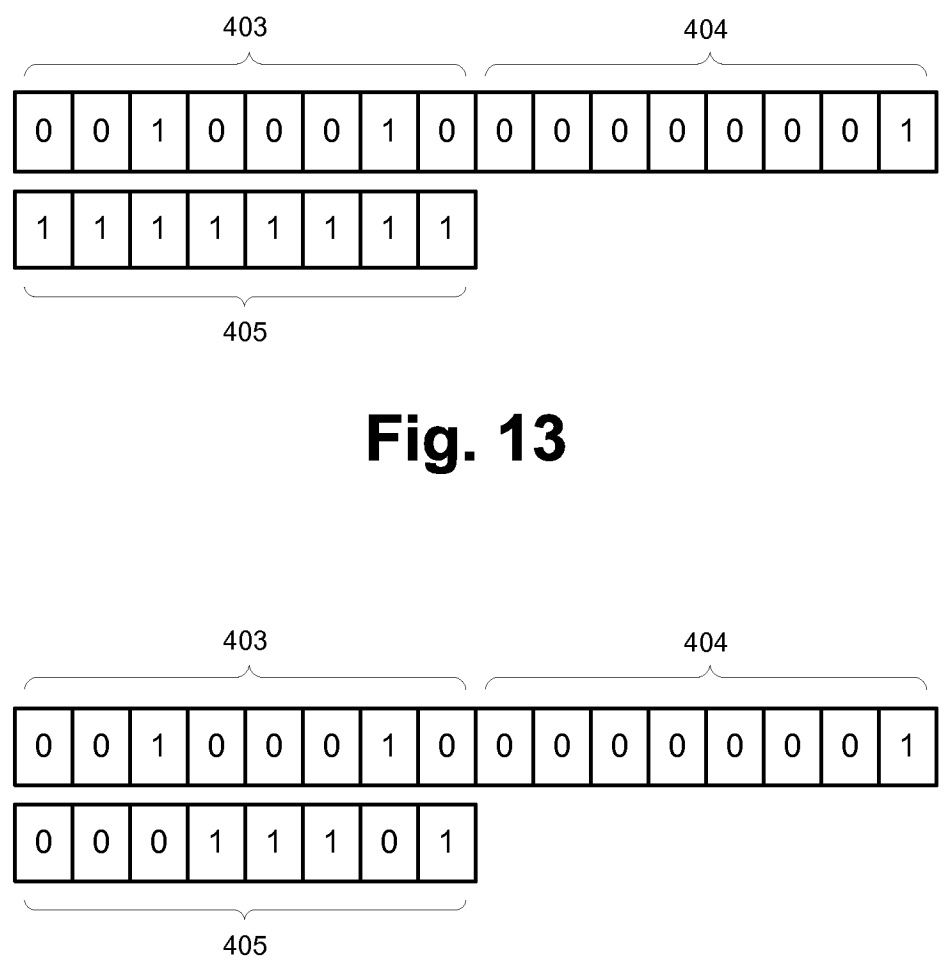

FIG. 13 is another example similar to FIG. 12, except in this case the query is for a link utilization of a link of the processing node 102, such as of the link that actually received the packet containing the query. Merely by way of example, the value of option type 403 is shown as binary 00100010 (decimal 34), which would signify a link utilization query. Again, any other value of option type 403 may be used to signify a link utilization query. Also by way of example, the option length 404 is shown as being one byte, and the option content 405 is shown as being all 1s, meaning in this example that the link utilization query is active and a response is expected (as opposed to all zeros, which in this example would signify that the link utilization query is inactive and no response is expected). Again, any other predetermined values may be used to signify an active or inactive query.

FIG. 14 shows an example reply destination options header that may be included in a reply message in response to a packet containing the destination options header of FIG. 13. In this example, the option type 403 and length 404 remain the same as in the query, and the processing node 102 populates the option content 405 with the desired response, which in this case would be the link utilization of the link of the node 102 that received the query (or of another link of the node 102). In this example, the link utilization is binary 00011101 (decimal 29).

The link utilization may be represented in any manner desired. In the present example, the value of decimal 29 represents a link utilization of 29%. To determine how to represent the link utilization in this example, node 102 may round the link utilization percentage to the nearest full percentage (e.g., 28.5% may be rounded to 29%, and 28.4% may be rounded to 28%). The rounded percentage may then be represented by seven out of the eight bits in option content 405. For example, the seven least significant bits may be used, or any other set of seven bits as desired. The remaining bit (e.g., the most significant bit) may be unused, and may be set to one or zero as appropriate. Thus, in this example, where the most significant bit is unused and set to zero, a 29% link utilization would be represented in binary as 00011101.

Figures 15, 16:
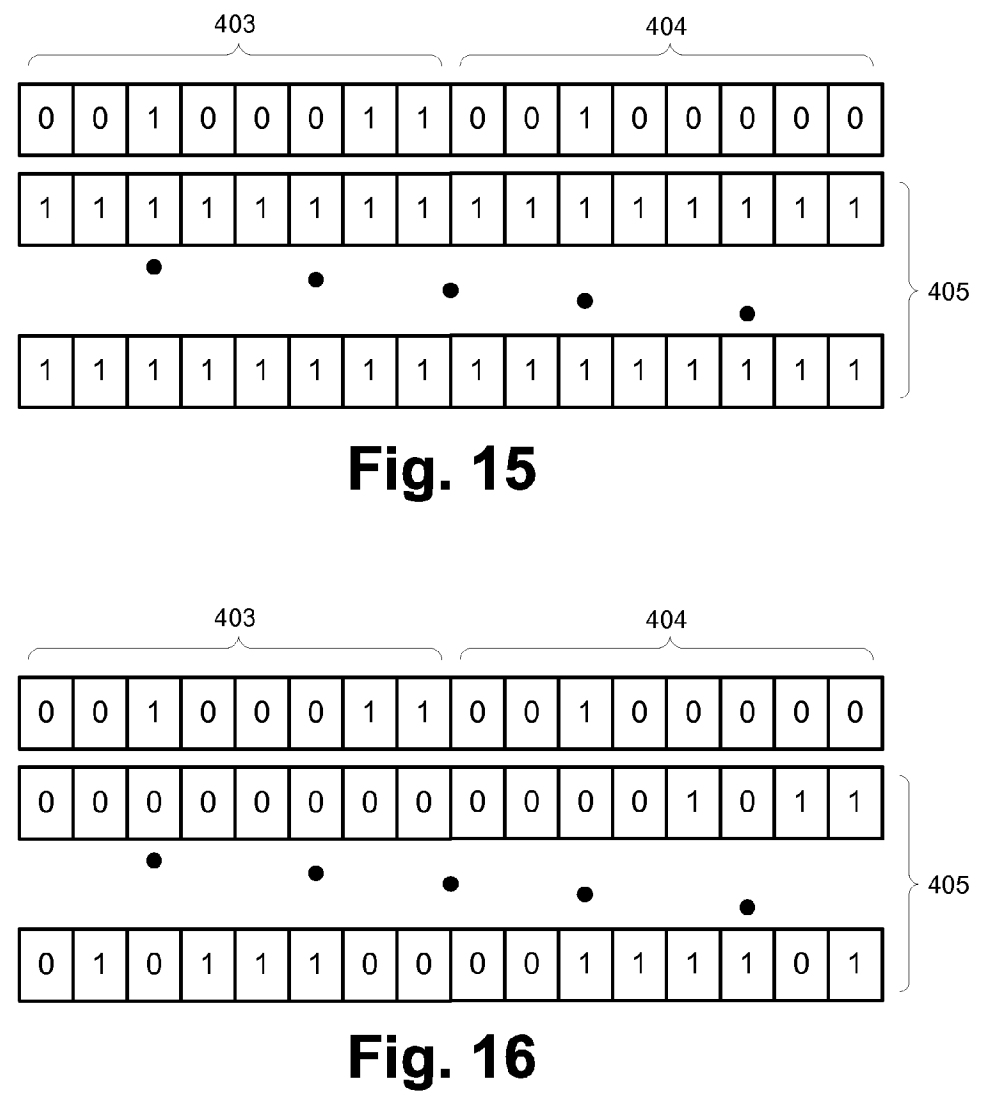

FIG. 15 is another example wherein the query is for an interface ID (interface identification) of an interface of the processing node 102, such as of the interface that actually received the packet containing the query. Merely by way of example, the value of option type 403 is shown as binary 00100011 (decimal 35), which would signify an interface ID query. Again, any other value of option type 403 may be used to signify a link utilization query. Also by way of example, the option length 404 is shown as being 32 bytes, and the option content 405 is shown as being all 1s, meaning in this example that the interface ID query is active and a response is expected (as opposed to all zeros, which in this example would signify that the interface ID query is inactive and no response is expected). Again, these values are merely examples; any other predetermined values may be used to signify an active or inactive query.

FIG. 16 shows an example reply destination options header that may be included in a reply message in response to a packet containing the destination options header of FIG. 15. Again, in this example, the option type 403 and length 404 remain the same as in the query, and the processing node 102 populates the option content 405 with the desired response, which in this case would be the interface ID of the interface of the node 102 that received the query (or of another interface of the node 102). In this example, the interface ID is represented as a thirty-two byte binary number, with any leading zeros (for instance) as needed if the interface ID is shorter than 32 bytes. Interface IDs are sometimes represented as a text string, and in such cases, the bits of option content 405 may represent a string of textual and/or symbolic characters, such as in ASCII format.

Figures 17, 18:
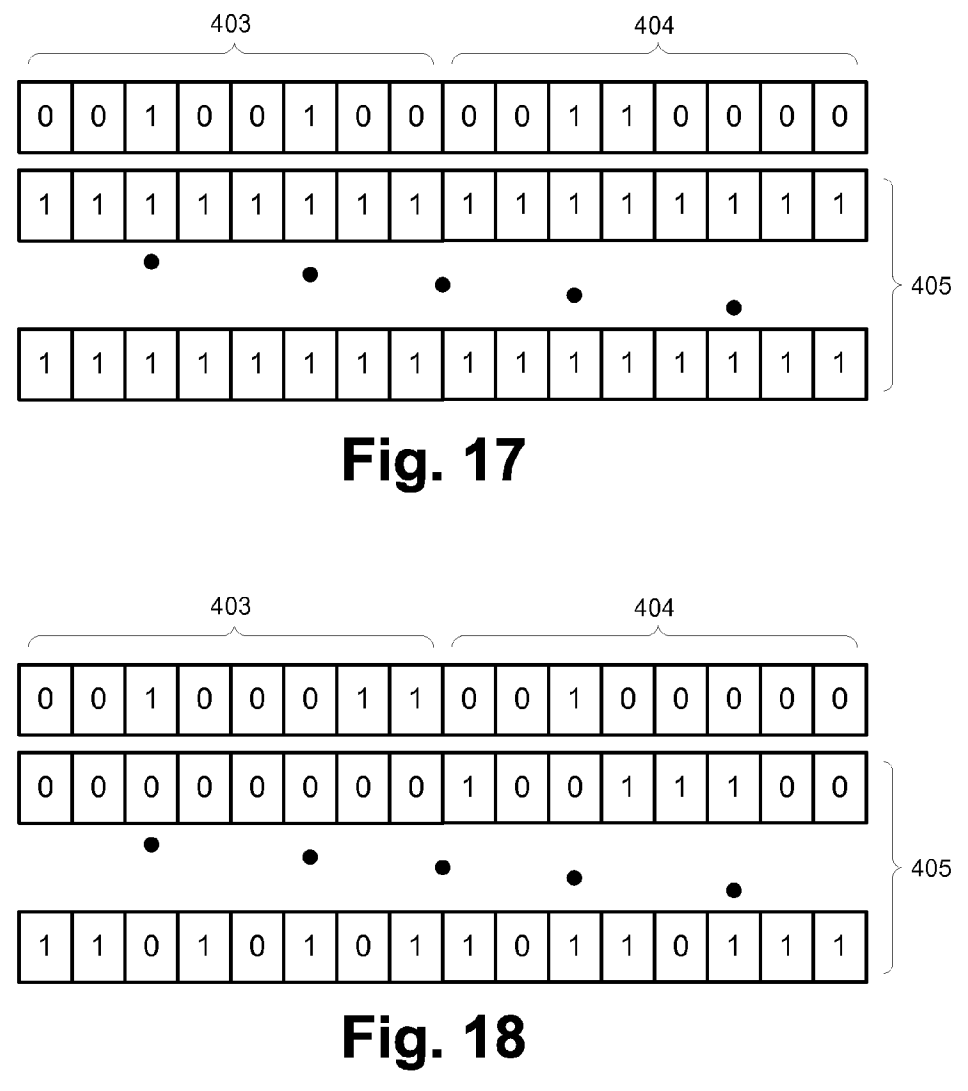

FIG. 17 is another example wherein the query is for a host name of the processing node 102. Merely by way of example, the value of option type 403 is shown as binary 00100100 (decimal 36), which would signify a host name query. Again, any other value of option type 403 may be used to signify such a query. Also by way of example, the option length 404 is shown as being 48 bytes, and the option content 405 is shown as being all 1s, meaning in this example that the host name query is active and a response is expected (as opposed to all zeros, which in this example would signify that the query is inactive and no response is expected). Again, any other predetermined values may be used to signify an active or inactive query.

FIG. 18 shows an example reply destination options header that may be included in a reply message in response to a packet containing the destination options header of FIG. 17. Again, in this example, the option type 403 and length 404 remain the same as in the query, and the processing node 102 populates the option content 405 with the desired response, which in this case would be the host name of the node 102 that received the query. In this example, the host name is represented as a forty-eight byte binary number, with any leading zeros (for instance) as needed if the host name is shorter than 48 bytes. Host names are typically represented as a text string, and so in such cases, the bits of option content 405 may represent a string of textual and/or symbolic characters, such as in ASCII format.

Each of the queries and responses may vary depending upon the predetermined mutual understandings and protocols arranged between the various elements of the network. Thus, each element of the network (e.g., source device 101 and nodes 102) may be configured to be able to send queries and/or interpret and respond to queries in a globally agreed-to manner. For example, if the link utilization is to be provided as a number X bits in length, then some or all of the nodes involved in such queries and responses may be configured to provide their link utilizations as numbers that are X bits in length in a common predetermined format. As another example, if a link utilization query is to be a destination options type 00011101 (decimal 29), rather than the previous example of decimal 34, then this may be commonly known by some or all elements of the network that are to be involved in the above-described query/response protocol.

However, not all of the nodes 102 in the network may be necessarily configured in the same manner with regard to the query/response protocol described above. For example, some of the nodes 102 may be configured to provide certain types of responses, such as host names, but others of nodes 102 may not provide host names. In some embodiments, each ASN of the network (in FIG. 1, e.g., ASN1, ASN2, ASN3, ASN4) may each have its own different policies for nodes 102 to respond to the queries. Where a given node 102 does not understand a particular query, that node 102 may ignore the query. For example, where the destination options header of an echo request packet includes both an ASN query and a link utilization query, and where the recipient node 102 is configured to interpret and respond to the ASN query but not the link utilization query, then the recipient node may respond to the ASN query and ignore the link utilization query. Alternatively, the recipient node 102 may respond to any non-understood queries with an error.

FIGS. 19-22 show various displayed example query results, each of which will be discussed below. While particular commands, domain names, ASNs, interface IDs, and other information are shown in these figures, it is to be understood that these are merely examples. Also, the particular layouts and formats of the displayed information are merely examples.

FIG. 19, in particular, is a display that may be generated at a display device of a source device, such as source device 101, showing example results of an ASN per-hop query. A traceroute output that includes per-hop ASN information may provide users, such as network operators, immediate knowledge on the number of hops in each autonomous system that a data packet will traverse to its destination. This knowledge may also help a network planner of a particular autonomous system determine whether a path should be optimized or otherwise modified to reduce the number of hops in that autonomous system and/or to modify peering with other autonomous systems.

In the example of FIG. 19, the user of the source device has input the command "traceroute ipv6.google.com as_path=y traceroute", which may mean that the user is requesting a query of each hop on the path to ipv6.google.com, where "as_path=y" means in this example that an ASN query is requested for each hop.

Upon sending and receiving a series of packets such as shown in FIG. 5 or 7, the source device may process the received packets and produce the results shown in FIG. 19. In this example, there are 17 hops from the source device to the identified destination (ipv6.google.com). For each network node (e.g., nodes 102) that returned a packet such as an echo reply packet or ICMP message, the destination options header of that returned packet indicated the respective ASN of that node. For example, the node of the first hop indicated that the ASN was 33662 (indicated in the display as "[AS 33662]."

FIG. 20 is a display that may be generated at the source device showing example results of a link utilization per-hop query. This type of information may indicate whether data packets will likely experience congestion en-route to a destination. In this example, the user of the source device has input the command "traceroute ipv6.google.com link_u=y", which may mean that the user is requesting a query of each hop on the path to ipv6.google.com, where "link_u=y" means in this example that a link utilization query is requested for each hop.

Again, upon sending and receiving a series of packets such as shown in FIG. 5 or 7, the source device may process the received packets and produce the results shown in FIG. 20. This time, for each of the network nodes that returned a packet, the destination options header of that returned packet indicated the respective link utilization of a link of that node. For example, the node of the first hop indicated that the link utilization was 15% (indicated in the display as "[LU 15%]."

As previously discussed, two or more different queries may be combined into the same destination options header. For example, FIG. 21 is a display that may be generated at the source device showing example results of a combined ASN and link utilization per-hop query, both of which are included in the same destination options header of each Traceroute packet. In this example, the user of the source device has input the command "traceroute ipv6.google.com as_path=y link_u=y", which may mean that the user is requesting a query of each hop on the path to ipv6.google.com, where "as_path=y" means in this example that a link utilization ASN query is requested for each hop, and link_u=y" means in this example that a link utilization query is also requested for each hop.

Again, upon sending and receiving a series of packets such as shown in FIG. 5 or 7, the source device may process the received packets and produce the results shown in FIG. 21. This time, for each of the network nodes that returned a packet, the destination options header of that returned packet indicated the respective link utilization of a link of that node and the ASN of that node. For example, the node of the first hop indicated that the ASN was 33662 and the link utilization was 17% (indicated in the display as "[AS 33662 LU 17%]."

FIG. 22 is a display that may be generated at the source device showing example results of a combined ASN, interface ID, link utilization, and host name per-hop query, all of which are included in the same destination options header of each Traceroute packet. In this example, the user of the source device has input the command "traceroute ipv6.google.com Int_ID=y Host=y AS_path=y link_u=y", which may mean that the user is requesting a query of each hop on the path to ipv6.google.com, where "Int_ID=y" means in this example that an interface ID query is requested for each hop, "Host=y" means that a host name query is requested for each hop, "AS_path=y" means that an ASN query is requested for each hop, and link_u=y" means in this example that a link utilization query is also requested for each hop.

Again, upon sending and receiving a series of packets such as shown in FIG. 5 or 7, the source device may process the received packets and produce the results shown in FIG. 21. This time, for each of the network nodes that returned a packet, the destination options header of that returned packet indicates the respective link utilization of a link of that node and the ASN of that node. For example, the node of the first hop indicates that the ASN is 33662 and the link utilization is 17% (indicated in the display as "[AS 33662 LU 17%]."

As also shown in the example of FIG. 22, all of the network nodes are configured to properly respond to link utilization and ASN queries, the network nodes of ASN 33662 and ASN 7922 are configured to properly respond to interface ID and host name queries, whereas the network nodes of ASN 6453 and ASN 15169 are not configured to respond to interface ID or host name queries. Thus, in this example, the host name displayed for hops 5-12 was obtained from the DNS only, and not from any returned message from the respective hops. Accordingly, in this example, the symbol "**" is provided immediately after the host name to indicate that DNS query data was used to provide the host name information for those hops. However, this is merely an example, and other symbols may be used.

Also in this example, the DNS did not have any IPv6 host name information for hops 1 and 3, and so the host name information for those hops was provided by the returned messages from those hops. And, the DNS information was incorrect for hop 2, and so the DNS information was overridden and instead the host name information from the hop 2 returned message was used. In this example, an indication of the override is displayed as a "*" symbol immediately after the host name. However, this is merely an example, and other symbols may be used.

Moreover, since hops 13-17 are part of ASN 15169, which in this example does not currently implement the interface ID and host name query response functionality, and since the host name information is also not available in the DNS, neither the interface ID nor host name information is displayed. The absence of this displayed information would, in this example, indicate the above situation to the user. However, a symbol or other type of indication may be used to indicate the absence of this or other information.

Thus, various example systems, methods, and software have been described that may provide a user with a tool for querying and obtaining per-hop information along a network path, and/or for verifying the host name of each hop against a data repository such as the DNS. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present disclosure. For example, the query and/or response information may be provided in other portions of a packet, such as in any other packet portion that may be responded to by the indicated destination but not by intermediate nodes in the path. Also, while IPv6 standards and protocols have been discussed by way of example, any of the features described herein may be implemented using other standards or protocols that support or are otherwise consistent with the described features.

What is claimed is:

1. A method, comprising:
   sending a first plurality of data packets each comprising a destination options header and each being sent with a different time-to-live indication;
   receiving a second plurality of data packets each identifying a different one of the first plurality of data packets and each identifying a different network address; and
   sending a third plurality of data packets each comprising a destination options header indicating a same first destination option type, each of the third plurality of data packets being addressed to a different one of the network addresses identified by the second plurality of data packets, wherein one or more of the same first destination option types identifies one or more parameters queried for of a plurality of parameters, and wherein at least one of the plurality of parameters is selected from the group consisting of: an autonomous system number (ASN), a link utilization, an interface ID, or a host name.

2. The method of claim 1, further comprising:
   receiving a fourth plurality of data packets each comprising a destination options header indicating the first destination option type and indicating a first destination option content associated with one of the network addresses; and
   causing a display device to display, for each of the fourth plurality of data packets, a representation of the identified network addresses and the associated first destination option content.

3. The method of claim 2, wherein for each of the fourth plurality of data packets, the first destination option content represents a host name of one of the network addresses, wherein the method further comprises:
   for each of the fourth plurality of data packets, comparing the host name and with a predetermined host name; and
   for each of the fourth plurality of data packets, causing the display device to display an indication responsive to the host name being different from the predetermined host name.

4. A method of claim 3, further comprising, for each of the fourth plurality of data packets, updating a database of host names with the host name represented by the respective data packet of the fourth plurality of data packets.

5. The method of claim 1, wherein each of the first plurality of data packets comprises a destination options header indicating the first destination option type.

6. The method of claim 1, wherein the destination options header of each of the third plurality of data packets also indicates a same second destination option type, and wherein the method further comprises:
   receiving a fourth plurality of data packets each comprising a destination options header indicating the first and second destination option types and indicating both a first destination option content and a second destination option content associated with one of the network addresses; and
   displaying, on a display device, for each of the fourth plurality of data packets, a representation of the identified network addresses, the associated first destination option content, and the associated second destination option content.

7. The method of claim 1, wherein sending the first plurality of data packets and sending the second plurality of data packets comprises sending the second plurality of data packets interleaved with the first plurality of data packets.

8. A non-transitory computer-readable medium storing computer-executable instructions for a computer to perform a method, the method comprising:
   sending a first plurality of data packets each comprising a destination options header and each being sent with a different time-to-live indication;
   determining a network address identified by each of a received second plurality of data packets each identifying a different one of the first plurality of data packets; and
   sending a third plurality of data packets each comprising a destination options header indicating a same first destination option type, each of the third plurality of data packets being addressed to a different one of the network addresses identified by the second plurality of data packets, wherein one or more of the same first destination option types identifies one or more parameters queried for of a plurality of parameters, and wherein at least one of the plurality of parameters is selected from the group consisting of: an autonomous system number (ASN), a link utilization, an interface ID, or a host name.

9. The non-transitory computer-readable medium of claim 8, wherein the method further comprises:
   determining a first destination option type and a first destination option content associated with one of the network addresses indicated by a destination options header of each of a received fourth plurality of data packets; and causing a display device to display, for each of the fourth plurality of data packets, a representation of the identified network addresses and the associated first destination option content.

10. The non-transitory computer-readable medium of claim 9, wherein for each of the fourth plurality of data packets, the first destination option content represents a host name of one of the network addresses, wherein the method further comprises:

for each of the fourth plurality of data packets, comparing the host name with a predetermined host name; and for each of the fourth plurality of data packets, causing the display device to display an indication responsive to the host name being different from the predetermined host name.

11. The non-transitory computer-readable medium of claim 10, wherein the method further comprises, for each of the fourth plurality of data packets, updating a database of host names with the host name represented by the respective data packet of the fourth plurality of data packets.

12. A method, comprising:

receiving at a network node a first data packet comprising a destination options header indicating a first destination option type;

performing a query, via the network node, for first information based on a value of the first destination option type, and wherein the first information comprises a selection from the group consisting of: an autonomous system number (ASN), a link utilization, an interface ID, or a host name; and sending a second data packet comprising a destination options header indicating the first destination option type and including the first information in a first destination option content portion of the destination options header.

13. The method of claim 12, wherein the first information comprises an autonomous system number (ASN) of the network node.

14. The method of claim 12, wherein the first information comprises a link utilization of a link by the network node.

15. The method of claim 12, wherein the first information comprises an interface ID of an interface of the network node.

16. The method of claim 12, wherein the first information comprises a host name of the network node.

17. The method of claim 12, wherein the destination options header of the first data packet further indicates a second destination option type and further includes a destination option content portion, and wherein the method further comprises:

determining whether the destination option content portion of the first data packet contains a predetermined value; and responsive to determining that the destination option content of the first data packet contains a predetermined value, determining second information based on a value of the second destination option type, wherein sending the second data packet comprising a destination options header further indicating the second destination option type, and further including the determined second information in a second destination option content portion of the destination options header.

18. The method of claim 12, wherein the first data packet is an echo request packet and the second data packet is an echo reply packet.

* * * * *

UNITED STATES PATENT AND TRADEMARK OFFICE
CERTIFICATE OF CORRECTION

PATENT NO. : 8,750,297 B2
APPLICATION NO. : 12/796903
DATED : June 10, 2014
INVENTOR(S) : Chia J. Liu It is certified that error appears in the above-identified patent and that said Letters Patent is hereby corrected as shown below:

IN THE SPECIFICATION

In column 1, line 51, replace "medium are described, which" with -- medium, which --

In column 6, line 46, replace "and the sake of" with -- and for the sake of --

In column 7, line 24, replace "It therefore may" with -- It, therefore, may --

In column 9, line 26, replace "and so in response" with -- and so in response, --

In column 9, line 44, replace "of the a received" with -- of the received --

In column 10, line 11, replace "AT" with -- At --

In column 13, line 13, replace "each have its own" with -- have its own --

In column 14, line 21, replace "and link_u=y" means" with -- and "link_u=y" means --

In column 14, line 46, replace "and link_u=y" means" with -- and "link_u=y" means --

IN THE CLAIMS

In column 16, line 10, replace "name and with" with -- name with --

Signed and Sealed this
Thirtieth Day of June, 2015

Michelle K. Lee
*Director of the United States Patent and Trademark Office*